United States Patent [19]

O'Reilly et al.

[11] 4,015,361
[45] Apr. 5, 1977

[54] FISH HOOK RETAINER

[76] Inventors: James J. O'Reilly; Agnes C. O'Reilly, both of 1232 Granville Road, Newark, Ohio 43055

[22] Filed: Oct. 10, 1975

[21] Appl. No.: 621,387

[52] U.S. Cl. .............................. 43/25.2; 43/57.5 R
[51] Int. Cl.² ....................................... A01K 97/06
[58] Field of Search ........................ 43/25.2, 57.5 R

[56] References Cited
UNITED STATES PATENTS

| | | | |
|---|---|---|---|
| 1,920,478 | 8/1933 | Norton | 43/25.2 |
| 2,767,502 | 10/1956 | Reynolds | 43/25.2 |
| 2,849,825 | 9/1958 | Reisner | 43/25.2 |
| 3,141,258 | 7/1964 | Mayer | 43/57.5 R |

Primary Examiner—Louis G. Mancene
Assistant Examiner—Daniel J. Leach
Attorney, Agent, or Firm—Allen D. Gutchess, Jr.

[57] ABSTRACT

A fish hook retainer for holding and covering a fish hook on a fishing pole is of one-piece construction and includes a structurally-integral hinge and a structurally-integral catch. The retainer is in the shape of a fish formed by two retainer halves connected by the structurally-integral hinge. The fish hook is retained in a cavity formed by the two halves with the fishing line extending out of the retainer through an opening located in a position corresponding to the mouth of the fish. One of the retainer halves is provided with means for attaching the retainer to the fishing pole. In one form, the retainer has an internal pin around which the fish hook extends to more effectively retain the hook within the retainer.

8 Claims, 3 Drawing Figures

FISH HOOK RETAINER

This invention relates to a fish hook retainer for holding and covering a fish hook on a fishing pole.

The fish hook retainer according to the invention is of a unique, low-cost, one-piece construction. It includes two halves which are connected by a hinge which is structurally integral with both halves along corresponding edges thereof. The halves also are provided with a structurally-integral catch at the edges opposite the hinge. An opening is located at one end of at least one of the retainer halves through which the fishing line extends and one of the halves has a structurally-integral loop near the fishing line opening by means of which the fish hook retainer can be attached to a fishing pole.

In a preferred form, the fish hook retainer is in the shape of a fish with each half being in the shape of a fish sliced longitudinally along a vertical plane. The catch then is formed in part by a dorsal fin on the back of the fish and the fish line opening is formed at the mouth of the fish. In addition, a flange to facilitate opening of the retainer can be provided at a lower portion of the fish, preferably between the hinge and the tail.

It is, therefore, a principal object of the invention to provide a low-cost, one-piece fish hook retainer.

Another object of the invention is to provide a fish hook retainer formed by two-half sections in the shape of a fish.

A further object of the invention is to provide a fish hook retainer which has a structurally-integral hinge and catch and structurally-integral means for attaching the retainer to a fishing pole.

Many other objects and advantages of the invention will be apparent from the following detailed description of a preferred embodiment thereof, reference being made to the accompanying drawings, in which.

Figure 1:
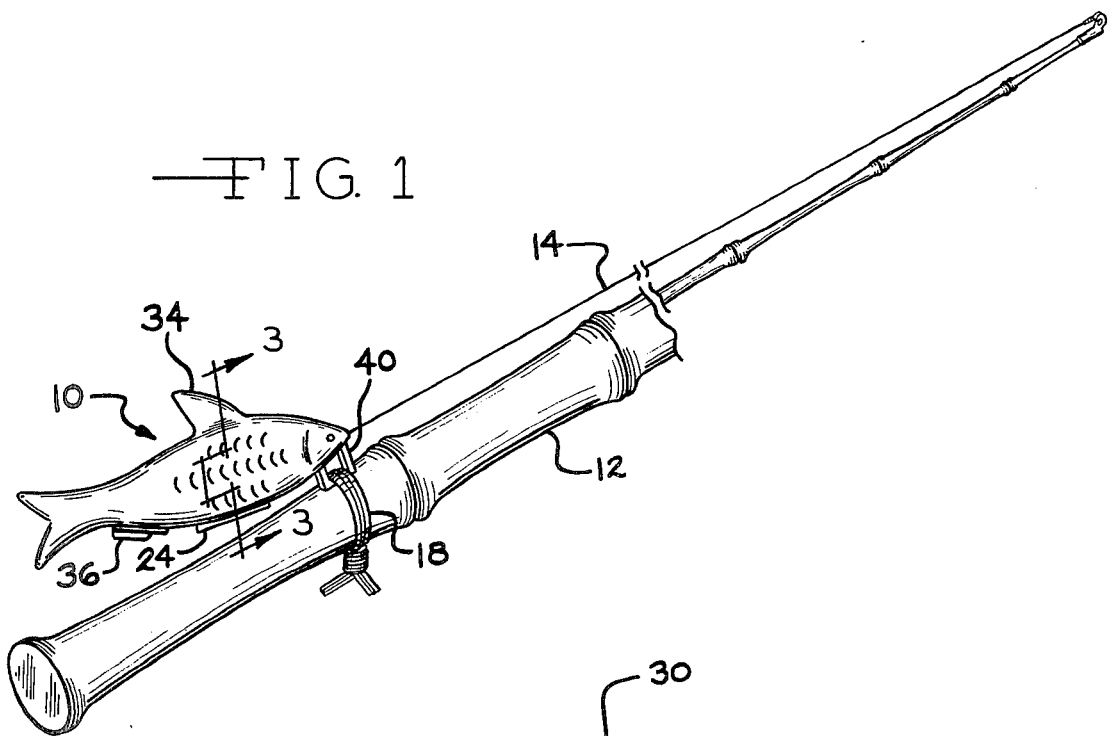
FIG. 1 is a view in perspective, with parts broken away, of a fishing pole having a fish hook retainer attached thereto and holding a fish hook in a retained and protected position.

Referring in particular to FIG. 1, a fish hook retainer according to the invention is indicated at 10 and is attached to a fishing pole 12. The fishing pole 12 is shown as of the long, bamboo variety, but it is to be understood that the fish hook retainer 10 can also be employed with a casting rod. With the long bamboo fishing pole 12, the placement of the fish hook retainer 10 will depend on the length of a fishing line 14. With a casting rod, the fish hook retainer 10 is located in an out-of-the-way position on the pole or rod adjacent the reel. On the bamboo pole 12, the line 14 is shown as attached to an eye at the tip of the pole; however, with a casting rod, the line would extend back along the pole and through other eyes to the reel, as will be readily understood.

The fish hook retainer 10 is shown somewhat oversize in FIG. 1 relative to the pole 12 for purposes of illustration. The fish hook retainer 10 is attached to the pole 12 by a plastic-covered wire 18; however, other tying elements can be employed for the purpose of attachment.

Figure 2:
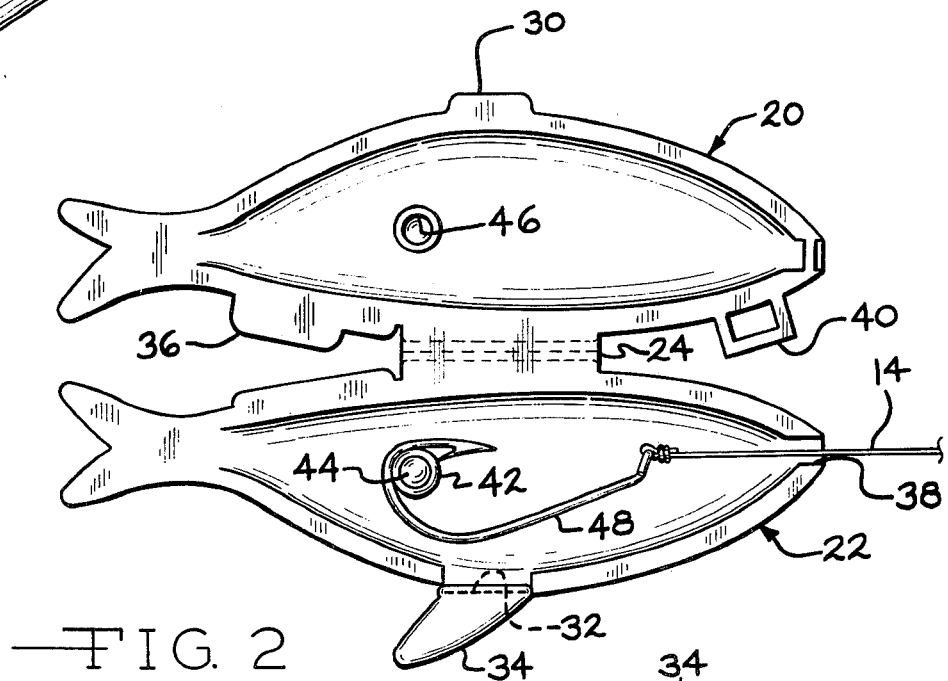
FIG. 2 is an enlarged plan view of the fish hook retainer of FIG. 1, shown in an opened, hook-receiving position.
Figure 3:
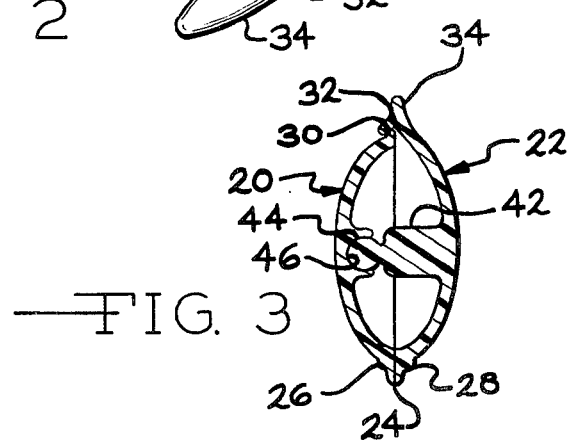
FIG. 3 is a view in transverse cross section taken along the line 3—3 of FIG. 1.

Referring more particularly to FIG. 2, the fish hook retainer 10 is made of two retainer or housing halves or portions 20 and 22, each of which has a shallow cavity which form a hook-enclosing space when the halves are closed. Each half also has the contour of a fish to provide the three-dimensional fish-like appearance, as best shown in FIG. 1. The lower portion or belly of the halves 20 and 22 is connected by a structurally-integral hinge or strap 24 which enables the halves 20 and 22 to pivot toward and away from one another along an axis which is parallel to their longitudinal extent. The hinge 24 actually structurally interconnects two rib portions 26 and 28 of the fish halves, with the hinge 24 being thinner than both of the ribs. A structurally-integral catch is formed on the opposite side or top of the two halves 20 and 22. This includes an upwardly-extending flange 30 on the half 20 which is recieved in a groove 32 formed in an anterior dorsal fin or projection 34 on the half 22. The flange 30 automatically snaps into place in the groove 32 when the two halves 20 and 22 are moved together, being pivoted about the hinge 24.

When it is desired to open and separate the two halves 20 and 22, the fin 34 is pushed to the side away from the flange 30 by the thumb of the fisherman to clear the flange 30 and enable the two halves 20 and 22 to be separated. To further facilitate the separation of the housing halves 20 and 22, the half 20 is provided with a downwardly-extending flange 36 which is located between the hinge 24 and the tail of the fish. The flange 36 is pushed with the other thumb of the fisherman in the same direction as the fin 34 when it is desired to open the retainer 10. This thumb action on the flange 36 urges the upper portion of th housing half 20 and specifically the flange 30 away from the fin 34.

The housing half 22, in this instance, also has an opening 38 at the forward portion of the retainer 10 to receive the fish line 14. Means in the form of a structurally-integral loop 40 to attach the retainer to the pole is located on the housing half 20, in this instance, near the opening 38 when the housing halves are closed.

A projection or pin 42 can be located within the cavity formed by the housing halves 20 and 22. As shown, the projection or pin 42 is affixed to, preferably being structurally-integral with, the housing half 22 and extends towards the housing half 20. The projection 42 has a protruding spherical tip 44 which is received in a recess or socket 46 in the housing half 20. This assures secure holding of a hook 48; further, the cooperation of the tip 44 and the recess 46 hold the two halves 20 and 22 together more securely, along with the flange 30 and the fin 34. The fish hook 48 is held by the pin 42 more effectively since without the pin 42, the hook may tend to pull outwardly through the mouth opening 38 and force outwardly the two halves 20 and 22 to separate them and release the hook.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A one-piece plastic fish hook retainer comprising a first housing portion having the contour of a fish and forming a shallow cavity, a second housing portion having the contour of a fish of the same size and shape as the first portion and forming a second shallow cavity, said cavities forming a hook-retaining space when the two portions are in closed, cooperating relationship, a hinge structurally integral with both of said housing portions at common edges thereof corresponding to the belly of the fish, one of said housing portions having an upwardly-extending catch flange at the edge opposite said hinge, the other of said housing portions having a dorsal fin at the edge opposite the hinge, said fin forming a groove to receive said flange, said fin being bendable to release said flange from said groove, the housing portion not having said dorsal fin having a release flange at the edge near said hinge to facilitate separation of said housing portions when the housing portions are to be separated.

2. A fish hook retainer according to claim 1 characterized by one of said housing portions having a fishing line opening at a position corresponding to the mouth of the fish, and one of said portions having structurally-integral means for attaching said retainer to a fishing pole.

3. A fish hook retainer according to claim 1 characterized by one of said housing portions having a structurally-integral pin therein extending toward the other housing portion when the two portions are closed.

4. A fish hook retainer according to claim 3 characterized by the housing portion not having said structurally-integral pin therein forming means to receive an end portion of said pin when said portions are closed.

5. A fish hook retainer for holding and covering a fish hook on a fishing pole, said retainer comprising a first housing portion and a second housing portion hinged together at corresponding edges thereof by a hinge which enables said portions to swing toward and away from one another along an axis which is substantially parallel to their longitudinal extent, one of said portions having structurally-integral first catch means on the edge opposite said hinge and the other portion having cooperating structurally-integral second catch means on the edge opposite said hinge and cooperating with said first catch means to hold the two portions closed when in cooperating relationship, at least one of said portions having an opening to receive a fishing line when the two portions are closed, one of said housing portions having a structurally-integral pin therein extending toward the other housing portion when the two portions are closed, and the housing portion not having said pin forming means to receive an end portion of said pin when said portions are closed.

6. A retainer according to claim 5 characterized by one of said housing portions having structurally-integral loop means for attaching said retainer to a fishing pole, said attaching means being located near said fishing line opening.

7. A retainer according to claim 5 characterized by each of said housing portions being in the shape of half a fish with said fishing line opening being at a position corresponding to the mouth of the fish, and means for attaching said retainer to a fishing pole located on one of said portions adjacent said opening when said portions are closed.

8. A retainer according to claim 5 characterized by said two housing portions being in the shape of a fish with said hinge being in a position corresponding to the belly of the fish and one of said catch means comprising a dorsal fin on the edge of said fish opposite said hinge.

* * * * *